US010227914B2

(12) United States Patent
Nakagawa et al.

(10) Patent No.: US 10,227,914 B2
(45) Date of Patent: Mar. 12, 2019

(54) ENGINE DEVICE

(71) Applicant: YANMAR CO., LTD., Osaka (JP)

(72) Inventors: Toshiaki Nakagawa, Osaka (JP); Takehiro Noda, Osaka (JP); Yuuya Hanada, Osaka (JP); Shunji Hamaoka, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 12 days.

(21) Appl. No.: 15/030,764

(22) PCT Filed: Oct. 22, 2014

(86) PCT No.: PCT/JP2014/078129
§ 371 (c)(1),
(2) Date: Apr. 20, 2016

(87) PCT Pub. No.: WO2015/064450
PCT Pub. Date: May 7, 2015

(65) Prior Publication Data
US 2016/0281591 A1 Sep. 29, 2016

(30) Foreign Application Priority Data
Oct. 28, 2013 (JP) ................. 2013-223638

(51) Int. Cl.
F02B 37/013 (2006.01)
F02B 37/00 (2006.01)
(Continued)

(52) U.S. Cl.
CPC ............ F02B 37/013 (2013.01); F01P 11/08 (2013.01); F02B 37/004 (2013.01);
(Continued)

(58) Field of Classification Search
CPC .... F02B 37/013; F02B 37/025; F02B 37/004; F02B 61/04; F01P 11/08; F02F 7/006; F02F 2007/0063; Y02T 10/144
(Continued)

(56) References Cited

U.S. PATENT DOCUMENTS

| 2009/0158724 | A1  | 6/2009 | Muller |
| 2011/0192161 | A1* | 8/2011 | Takahaski ........... F02B 29/0412 60/602 |
| 2013/0167785 | A1* | 7/2013 | Palazzolo ............... F02B 75/22 123/41.33 |
| 2015/0059712 | A1* | 3/2015 | Bakindi ........... F02M 35/10268 123/542 |
| 2016/0138462 | A1  | 5/2016 | Nishiura et al. |

FOREIGN PATENT DOCUMENTS

| EP | 2 511 511 | 10/2012 |
| EP | 2511511 A1 | 10/2012 |

(Continued)

Primary Examiner — Joseph J Dallo
Assistant Examiner — Scott A Reinbold
(74) Attorney, Agent, or Firm — Norton Rose Fulbright US LLP

(57) ABSTRACT

An engine device in which exhaust pipes and an intake pipe can be mounted highly rigidly by using an upper face corner of a cylinder block in an engine, and a support structure of the exhaust pipes and the intake pipe can be simplified. In an engine device in which a first supercharger and a second supercharger are disposed in series on an exhaust gas discharge path of an engine, the engine device has a structure in which the first supercharger and the second supercharger are disposed to be divided on opposed side faces of the engine, and an upper side exhaust pipe between the engine and the first supercharger, a lower side exhaust pipe between the first supercharger and the second supercharger, and an intake pipe between the first supercharger and the second supercharger extend to be substantially flush with one
(Continued)

another at a head-cover disposed-height of an upper face of the engine.

4 Claims, 15 Drawing Sheets

(51) Int. Cl.
    *F02B 37/02*     (2006.01)
    *F01P 11/08*     (2006.01)
    *F02F 7/00*     (2006.01)
    *F02B 61/04*     (2006.01)

(52) U.S. Cl.
    CPC ............ *F02B 37/025* (2013.01); *F02B 61/04* (2013.01); *F02F 7/006* (2013.01); *F02F 2007/0063* (2013.01); *Y02T 10/144* (2013.01)

(58) Field of Classification Search
    USPC ...................................................... 123/41.33
    See application file for complete search history.

(56) References Cited

FOREIGN PATENT DOCUMENTS

| | | | | |
|---|---|---|---|---|
| EP | 2647806 A1 | 10/2013 | | |
| EP | 3009630 A1 | 4/2016 | | |
| GB | 1603575 | 5/1978 | | |
| GB | 1603575 A | * 11/1981 | ............ | F02B 33/44 |
| JP | S53-139012 A | 12/1978 | | |
| JP | S60-120229 U | 8/1985 | | |
| JP | 6-066146 | 3/1994 | | |
| JP | 2009-150393 A | 7/2009 | | |
| JP | 2013-204494 | 10/2013 | | |
| WO | WO-2012/016712 | 2/2012 | | |
| WO | WO-2012/123629 | 9/2012 | | |

\* cited by examiner

ENGINE DEVICE

TECHNICAL FIELD

The invention of the present application relates to engine devices to be installed in vessels, etc., and relates to an engine device including a two-stage supercharger that efficiently burns fuel.

BACKGROUND OF THE INVENTION

Hitherto, referring to, for example, prior art documents, there is a technique (see, for example, Patent Document 1, Patent Document 2, etc.) in which, in an engine provided with a high pressure supercharger and a low pressure supercharger, by increasing a supply air pressure of the engine, an increase in combustion efficiency is achieved while preventing a supply air temperature of the engine from increasing.

PATENT DOCUMENTS

Patent document 1: Japanese Unexamined Patent Application Publication No. 06-66146
Patent document 2: International Publication No. 2012/016712

SUMMARY OF INVENTION

As in Patent document 1, in a structure in which a high pressure supercharger, an aftercooler, or the like, is installed on an upper face of an engine, an installation height dimension of the engine is large, causing a problem such as inability to easily install the engine in a vessel or the like, in which the installation height dimension of the engine is limited. In addition, as in Patent document 2, in a structure in which a high pressure supercharger and a low pressure supercharger are disposed to be divided on opposed side faces of an engine, an installation height dimension of the engine can compactly be formed and maintenance of each supercharger is facilitated, exhaust pipes for connecting to the superchargers and an intake pipe are disposed closer to a side face portion of one side of an engine block provided with an exhaust manifold. Thus, each exhaust pipe or the intake pipe is likely to protrude from the side face portion of the one side of the engine block toward its outward side, causing a problem such as inability to compactly form a piping structure of the exhaust pipe, the intake pipe, or the like. In addition, it is necessary to dispose, on a side face portion of the other side of the engine block, an attachment component such as an engine operating tool or an engine oil cooler, so that the attachment component is in proximity to a location where driving of the engine is operated. This results in a problem such as easy movement of an operator.

It is an object of the invention of the present application to provide an engine device in which improvements have been achieved on the basis of studying the above-described circumstance.

An engine device according to the invention is an engine device in which a first supercharger and a second supercharger are disposed in series on an exhaust gas discharge path of an engine, wherein the engine device has a structure in which the first supercharger and the second supercharger are disposed to be divided on opposed side faces of the engine, and wherein an upper side exhaust pipe between the engine and the first supercharger, a lower side exhaust pipe between the first supercharger and the second supercharger, and an intake pipe between the first supercharger and the second supercharger extend to be substantially flush with one another at a head-cover-disposed height of an upper face of the engine.

The invention is the engine device, wherein the engine device has a structure in which an exhaust inlet portion of the upper side exhaust pipe is connected to a cylinder head of the engine, and the lower side exhaust pipe is connected to and supported by the upper side exhaust pipe via a connection bracket body.

The invention is the engine device, wherein an upper side pipe and a lower side pipe are provided as the upper side exhaust pipe, and the upper side pipe and the lower side pipe are fixedly set up at substantially the same height.

The invention engine device has a structure in which the cylinder head is fastened to a cylinder block of the engine by a head fixing bolt, and the intake pipe is attached to the head fixing bolt via an intake pipe support body.

The invention is the engine device, wherein the engine device has a structure in which an attachment component, such as an oil cooler of the engine, is disposed at one side of a cylinder block of the engine, and an engine operating tool is disposed at the other side of the cylinder block in the engine, and wherein the upper side exhaust pipe or the lower side exhaust pipe is disposed so as to be closer to an upper face side, of the one side on which the attachment component is disposed, on the upper face side of the engine.

According to the invention, in an engine device in which a first supercharger and a second supercharger are disposed in series on an exhaust gas discharge path of an engine, the engine device has a structure in which the first supercharger and the second supercharger are disposed to be divided on opposed side faces of the engine, and an upper side exhaust pipe between the engine and the first supercharger, a lower side exhaust pipe between the first supercharger and the second supercharger, and an intake pipe between the first supercharger and the second supercharger extend to be substantially flush with one another at a head-cover-disposed height of an upper face of the engine. Thus, the respective exhaust pipes and the intake pipe can compactly be disposed around the head cover, and the installation height dimension of the engine can compactly be formed. Nevertheless, by using an upper corner portion of each cylinder block of the engine, the respective exhaust pipes and the intake pipe can be mounted highly rigidly, and a support structure of the respective exhaust pipes and the intake pipe can easily be simplified.

According to the invention, the engine device has a structure in which an exhaust inlet portion of the upper side exhaust pipe is connected to a cylinder head of the engine, and the lower side exhaust pipe is connected to and supported by the upper side exhaust pipe via a connection bracket body. Thus, a support structure of the lower side exhaust pipe can be formed highly rigidly, and a support structure of the lower side exhaust pipe can easily be simplified. Nevertheless, at an engine-outside of or above the upper side exhaust pipe, whose temperature increases, the lower side exhaust pipe, whose temperature is lower than that of the upper side exhaust pipe.

According to the invention, an upper side pipe and a lower side pipe are provided as the upper side exhaust pipe, and the upper side pipe and the lower side pipe are fixedly set up at substantially the same height. Thus, within a vertical dimension of the cylinder head and the head cover in the diesel engine, the upper side exhaust pipe and the lower side exhaust pipe can compactly extend.

According to the invention, the engine device has a structure in which the cylinder head is fastened to a cylinder block of the engine by a head fixing bolt, and the intake pipe is attached to the head fixing bolt via an intake pipe support body. Thus, support strength of the intake pipe support body can easily be ensured, a support structure of the intake pipe can be formed highly rigidly, and the support structure of the intake pipe can easily be simplified by using the head fixing bolt in common.

According to the invention, the engine device has a structure in which attachment components, such as an oil cooler of the engine, is disposed at one side of a cylinder block of the engine, and an engine operating tool is disposed at the other side of the cylinder block in the engine, wherein the upper side exhaust pipe or the lower side exhaust pipe is disposed so as to be closer to an upper face side, of the one side on which the attachment components are disposed, on the upper face side of the engine. Thus, in a position away from the exhaust pipes or the attachment component, an operator can execute operating works such as an operation of starting or stopping the engine. On the other side of the cylinder block in the engine in which the engine operating tool is disposed, the intake pipe, whose temperature is relatively low, is supported, and the number of attachment components on the other side of the cylinder block can be reduced. Operating work space for operator can easily be reserved at the other side of the cylinder block. In addition, exhaust heat (radiant heat) of the respective exhaust pipes or the attachment components, etc., can be prevented from affecting the operator at the other side of the cylinder block, so that operating workability of operation of starting or stopping the engine, etc., can easily be improved.

DESCRIPTION OF THE PREFERRED EMBODIMENTS

An embodiment in which the invention of the present application has been embodied will be described below on the basis of drawings of a case in which the invention is applied to a diesel engine of a power generator installed in a vessel.

Figure 1:
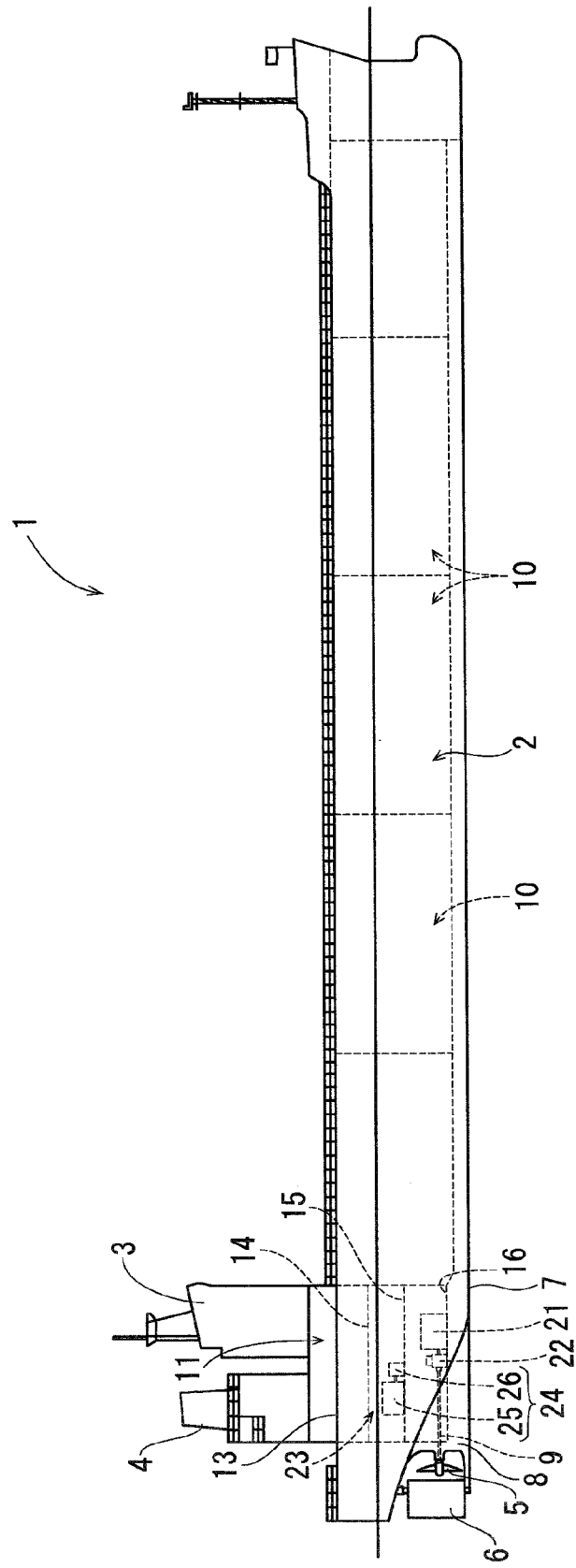
FIG. 1 is an entire side view of a vessel.
Figure 2:
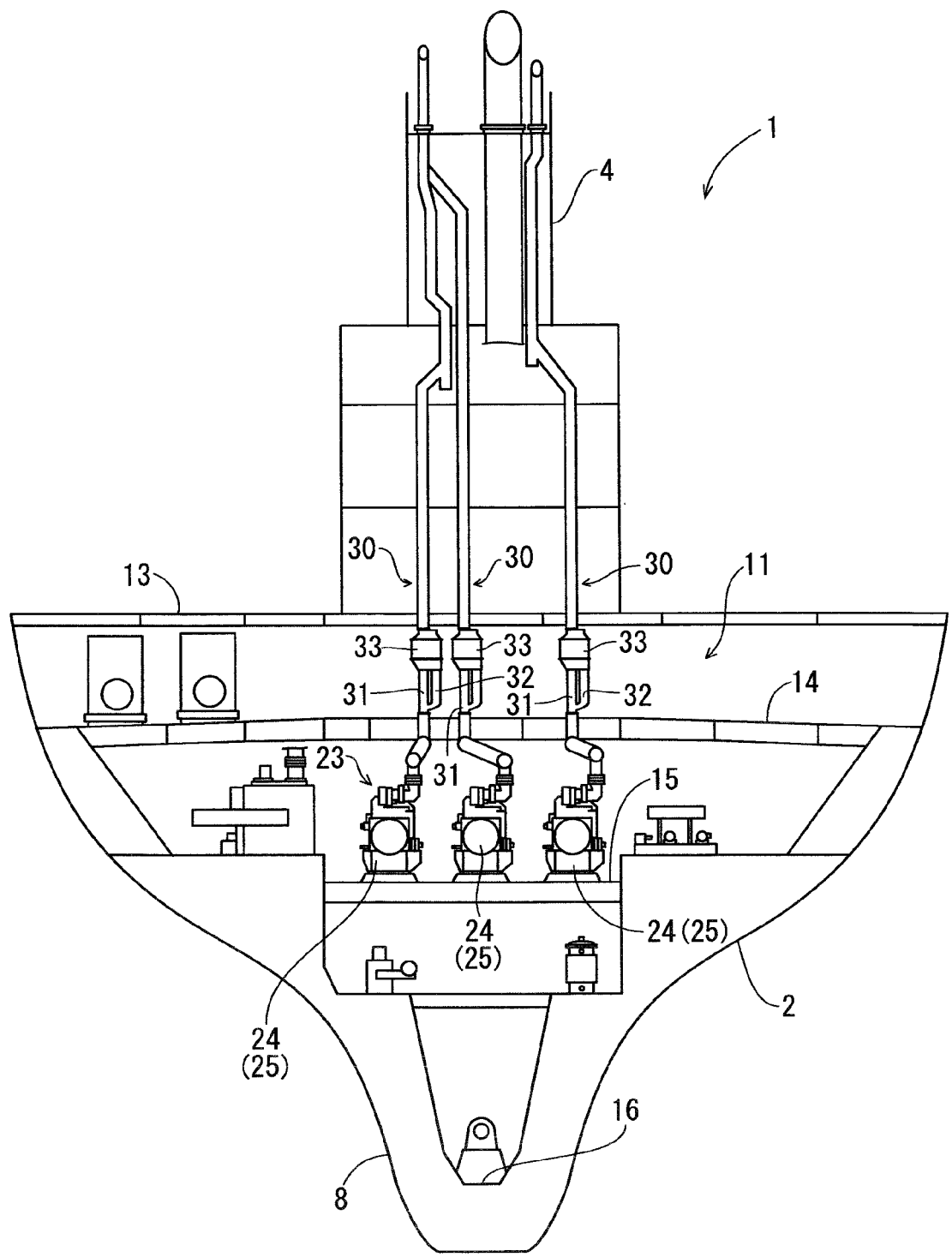
FIG. 2 is a longitudinal sectional view of FIG. 1.

First, an outline of a vessel 1 in which a diesel engine is installed will be described with reference to FIGS. 1 and 2. As illustrated in FIGS. 1 and 2, the vessel 1 includes a vessel body 2, a cabin 3 (bridge) provided on a stern of the vessel body 2, a funnel 4 disposed behind the cabin 3, and a propeller 5 for propulsion and a rudder 6 for steering that are provided at a rear lower portion of the vessel body 2. In addition, a stern skeg 8 is integrally formed on a vessel bottom 7 at the rear lower portion of the vessel body 2, and a propelling shaft 9 that rotationally drives the propeller 5 for propulsion is included and supported by the stern skeg 8. Holds 10 are provided at a stem side and a central portion in the vessel body 2. An engine room 11 is provided in the vessel body 2 at the stern side.

In the engine room 11, a diesel engine 21 as a main machine that is a driving source for the propeller 5 for propulsion, a speed reducer 22, a power generating apparatus 23 for supplying electric power to electrical systems in the vessel body 2 are disposed. The propeller 5 is rotationally driven by rotational force from the main engine 21 via the speed reducer 22. The inside of the engine room 11 is vertically partitioned by an upper deck 13, a second deck 14, a third deck 15, and an inner bottom plate 16. The main engine 21 and the speed reducer 22 are installed on the inner bottom plate 16, which is at the lowermost stage in the engine room 11, and the power generating apparatus 23 is installed on the third deck 15, which is a middle stage in the engine room 11. Note that the Holds 10 are divided into plural compartments.

As illustrated in FIG. 2, the power generating apparatus 23 includes three diesel power generators 24. Each diesel power generator 24 is a combination of six-cylinder power generating diesel engine 25 as an auxiliary machine, and a power generator 26 that is caused to generate power by driving of the power-generating diesel engine 25. The three diesel power generators 24 are operated in response to a necessary amount of electric power. In the case (for example, such as at the time of leaving or entering a port) of a large amount of electric power, all the diesel power generators 24 are operated, while in the case (for example, such as at the time of anchoring) of a relatively small amount of electric power, by selectively operating the three diesel power generators 24, generated power can be supplied from the power generator 26 of each diesel power generator 24 to each electrical system in the vessel body 2.

Also, as illustrated in FIG. 2, an exhaust gas discharge pipe 30 of the power-generating diesel engine 25 of each diesel power generator 24 communicates from the funnel 4 with the exterior. The three power-generating diesel engines 25 are installed for generating power, and the three exhaust gas discharge pipes 30 are present for the respective power-generating diesel engines 25. The exhaust gas discharge pipe 30 of each power-generating diesel engine 25 includes a main path 31 extending to the funnel 4, a bypass path 32 that branches off from an intermediate portion of the main path 31, and a complex casing 33 that communicates with both the main path 31 and the bypass path 32. In other words, the three power-generating diesel engines 25 are installed, and respective exhaust gas purification systems that each include the main path 31, the bypass path 32, and the complex casing 33 correspond to the respective diesel engines 25.

The complex casing 33 is made of heat resistant metal material, is rectangular cylindrical, and is disposed above (at an upper side of the engine room 11) the second deck 14, on which each power-generating diesel engine 25 is disposed. The main path 31 in the complex casing 33 accommodates an NOx catalyst (not illustrated) as a selective reduction catalyst device that prompts reduction of NOx in exhaust gas of the diesel engine 25. The exhaust gas is purified by passing through the NOx catalyst in the main path 31. The bypass path 32 is a path for diverting the exhaust gas with respect to the NOx catalyst. That is, the exhaust gas that moves through the bypass path 32 does not pass through the NOx catalyst. At an exhaust outlet side of the complex casing 33, the main path 31 and the bypass path 32 are joined.

Note that, in a branch portion of the main path 31 and the bypass path 32 on an exhaust gas inlet side of the complex casing 33, a main side switch valve and a bypass side switch valve are provided as a path switch member that switches an exhaust gas moving direction to the main path 31 or the bypass path 32. In a state (in which the bypass side switch valve is closed) in which the main side switch valve is open, the exhaust gas in the exhaust gas discharge pipe 30 passes through the main path 31 (NOx catalyst) in the complex casing 33 to be subjected to purification treatment before being released outside the vessel 1. In a state (in which the main side switch valve is closed) in which the bypass side switch valve is open, the exhaust gas in the exhaust gas discharge pipe 30 bypasses the NOx catalyst before being released outside the vessel 1 without being subjected to purification treatment.

Next, the power generating diesel engine 25 and an exhaust gas discharge structure will be described with reference to FIGS. 3 to 15. As illustrated in FIGS. 3 to 9, the power generating diesel engine 25 and the power generator 26 are placed on a base frame 41. At one side of the diesel engine 25, an output shaft (crank shaft) 42 is provided in a protruding manner, and a flywheel 43 is pivotally supported by the output shaft 42. In addition, with the output shaft 42 linked to the power generator 26, the power generator 26 can be driven by the diesel engine 25.

In addition, the diesel engine 25 includes a six-cylinder cylinder block 44 fixedly placed on the base frame 41, an oil pan 45, as an engine oil tank, provided on a lower face side of the cylinder block 44, a cylinder head 46 disposed at an upper face side of the cylinder block 44, and six-cylinder head covers 47 disposed at an upper face side of the cylinder head 46. A fuel-pump-disposed room 48 is provided on one longitudinal side face of the cylinder block 44, which has a quadrangular box shape, and an intake manifold 49 is formed on another longitudinal side face of the cylinder block 44. Two first and second exhaust manifolds 51 and 52 are disposed on another longitudinal side face of the cylinder head 46, which is above the intake manifold 49.

Note the following. One longitudinal side face of the cylinder block 44 (cylinder disposed width for four cylinders), in which the fuel-pump-disposed room 48 is disposed, is referred to as a front face of the diesel engine 25. Another longitudinal side face of the cylinder head 46, in which the intake manifold 49 and the first and second exhaust manifolds 51 and 52 are disposed, is referred to as a back face of the diesel engine 25. One side face in a shorter direction (cylinder disposed width for one cylinder) of the cylinder block 44, in which the power generator 26 is disposed, is referred to as a left side face of the diesel engine 25, and another side face in the shorter direction of the cylinder block 44 is referred to as a right side face of the diesel engine 25. In addition, intake and exhaust valves (not illustrated) are attached to the cylinder head 46, and an opening-and-closing mechanism for the intake and exhaust valves, etc., are provided inside the head cover 47. Also, a fuel pump, a fuel pump, a fuel pump driving shaft, etc., are disposed in the cylinder block 44 in the part of the fuel-pump-disposed room 48.

As illustrated in FIGS. 3 to 9, fuel system attachment components, such as the fuel pump, are provided in the fuel-pump-disposed room 48 at the front face side of the diesel engine 25, while intake-and-exhaust system attachment components, such as the intake manifold 49 and the exhaust manifolds 51 and 52, are provided on each side face of the cylinder block 44 and the cylinder head 46 at the back face side of the diesel engine 25. The fuel system attachment components and the intake-and-exhaust system attachment components are fixedly set up to be divided on the front face side and back face side of the diesel engine 25. In addition, the exhaust manifolds 51 and 52 include a first exhaust manifold 51 caused to communicate with first, fourth and fifth cylinders of the diesel engine 25, and a second exhaust manifold 52 caused to communicate with second, third, and sixth cylinders of the diesel engine 25. The first exhaust manifold 51 and the second exhaust manifold 52 are disposed in parallel so as to be respectively above the intake manifold 49 and above the first exhaust manifold 51. In addition, between the head covers 47 and the second exhaust manifold 52, an engine cooling water pipe 53 for cooling the diesel engine 25 extends in parallel to the second exhaust manifold 52.

Further, as illustrated in FIGS. 3 to 11, a two-stage supercharger 55 connected to the intake manifold 49 and the exhaust manifolds 51 and 52 includes a high pressure supercharger 56 and a high pressure side intercooler 57, and a low pressure supercharger 58 and a low pressure side intercooler 59. The low pressure supercharger 58 and the low pressure side intercooler 59 are disposed, in an outer circumferential face of the diesel engine 25, above one side face (left side face of the diesel engine 25) in the shorter direction of the cylinder block 44, in which the power generator 26 is disposed, while the high pressure supercharger 56 and the high pressure side intercooler 57 are disposed on another shorter-side side face (right side face of the diesel engine 25) of the cylinder block 44.

In other words, the low pressure side intercooler 59 and the high pressure side intercooler 57 are installed so as to face each other above opposed side faces of the diesel engine 25 (cylinder block 44). The low pressure supercharger 58 is provided at an upper face side of the low pressure side intercooler 59, and the high pressure supercharger 56 is provided at an upper face side of the high pressure side intercooler 57. In addition, the high pressure supercharger 56 includes a high pressure compressor 61 and a high pressure turbine 60, and the low pressure supercharger 58 includes a low pressure compressor 63 and a low pressure turbine 62. An exhaust gas inlet 64 of the high pressure turbine 60 is linked to the first and second exhaust manifolds 51 and 52, an exhaust gas inlet 67 of the low pressure turbine 62 is linked to an exhaust gas outlet 65 of the high pressure turbine 60 via a high pressure exhaust gas pipe 66, and an exhaust gas input side end portion of the exhaust gas discharge pipe 30 is linked to an exhaust gas outlet 65 of the low pressure turbine 62.

With the above-described configuration, the exhaust gas of the power generating diesel engine 25, discharged from the first and second exhaust manifolds 51 and 52, moves sequentially to the high pressure turbine 60, the high pressure exhaust gas pipe 66, and the low pressure turbine 62. Subsequently, the exhaust gas moves from the exhaust gas outlet 68 of the low pressure turbine 62 to the exhaust gas discharge pipe 30, is purified by the complex casing 33 provided in a midst of the exhaust gas discharge pipe 30, and is discharged outboard. In addition, the high pressure compressor 61 is driven by the high pressure turbine 60, and the low pressure compressor 63 is driven by the low pressure turbine 62.

On the other hand, a fresh air input side of the low pressure turbine 62 is provided with an intake filter 71, and the low pressure side intercooler 59 is connected to a fresh air sending side of the low pressure compressor 63 via a low pressure fresh air passage body 72. A fresh air input side of the high pressure compressor 61 is connected to the low pressure side intercooler 59 via a fresh air introduction pipe 73, and the high pressure side intercooler 57 is connected to a fresh air sending side of the high pressure compressor 61 via a high pressure fresh air passage body 74. Fresh air taken in from the intake filter 71 is pressed by the low pressure compressor 63, and is next cooled by the low pressure side intercooler 59. Subsequently, the fresh air moves to and is further pressed by the high pressure compressor 61, and is cooled by the high pressure side intercooler 57 before being sent to the intake manifold 49.

Further, as illustrated in FIGS. 3, 5, 8, and 9, a lubricant oil mechanism 80 that circulates engine oil of the power generating diesel engine 25 is provided. The lubricant oil mechanism 80 includes an oil pump 81 that sends engine oil of the oil pan 45, an oil cooler 82 that cools the engine oil, and an oil filter 83 that purifies the engine oil. In a side face (right side face of the diesel engine 25) in the shorter direction of the cylinder block 44, in which the high pressure side intercooler 57 is disposed, the oil pump 81 is fixed to a side face of the cylinder block 44, which is below the high pressure side intercooler 57. In addition, in a side face (back face of the diesel engine 25) of the cylinder block 44 in which the intake manifold 49 and the first and second exhaust manifolds 51 and 52 are disposed, the oil cooler 82 and the oil filter 83 are fixed in a row to a side face of the cylinder block 44 which is below the high pressure exhaust gas pipe 66. The engine oil in the oil pan 45 is circulated in the cylinder block 44, the cylinder head 46, or the like via the oil cooler 82 and the oil filter 83.

Figure 5:
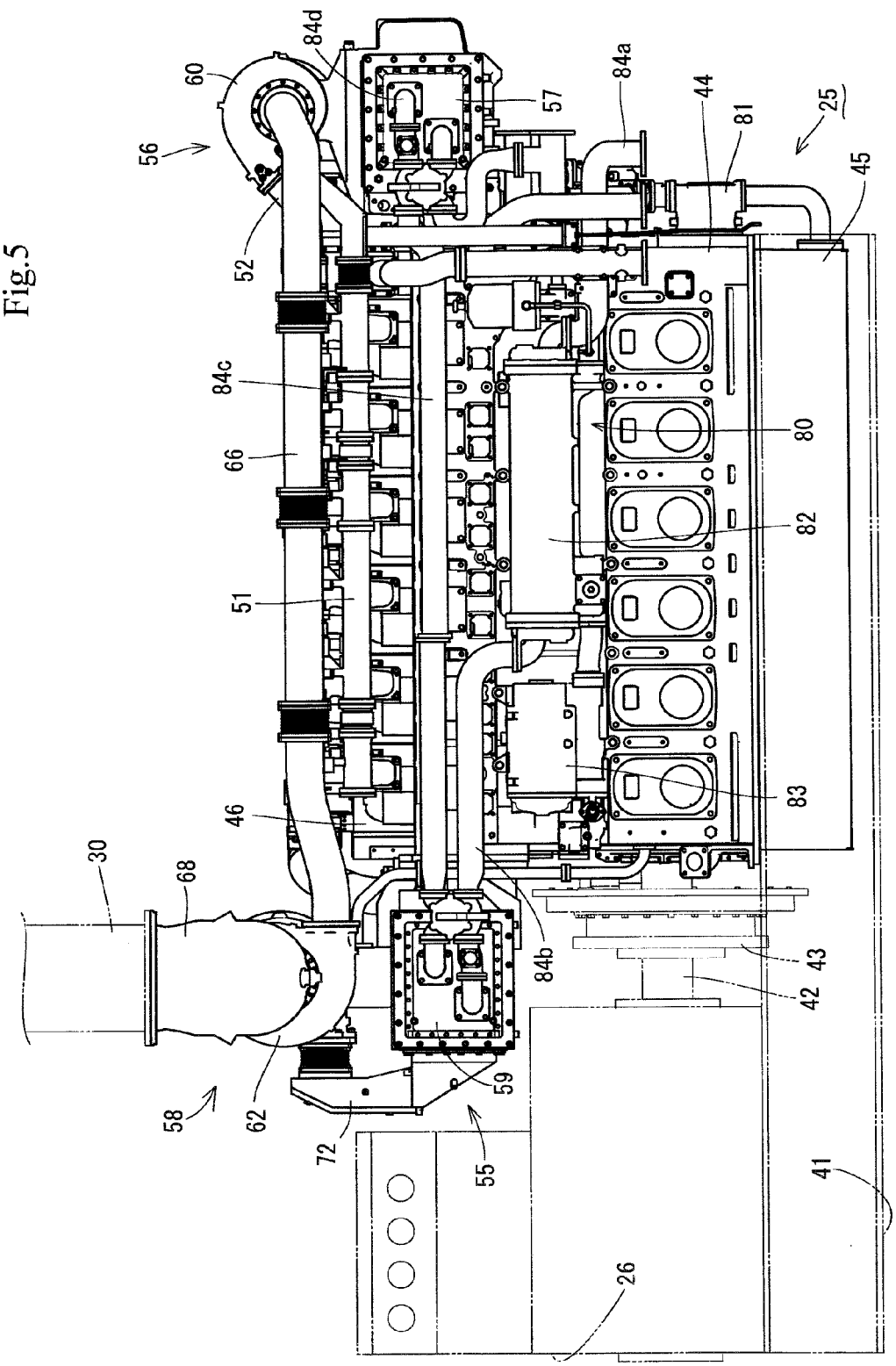
FIG. 5 is a side view illustrating an intake-and-exhaust manifold side (left side face) of the diesel engine.

As illustrated in FIG. 5, the intake manifold 49, the first and second exhaust manifolds 51 and 52, the high pressure exhaust gas pipe 66, the oil cooler 82, and the oil filter 83 are disposed so as to be closer to a side face of the cylinder block 44 which opposes one longitudinal side face (front face of the diesel engine 25) of the cylinder block 44 in which the fuel-pump-disposed room 48 is disposed. In addition, a cooling water pump, which is not illustrated, is connected to the high pressure side intercooler 57, the low pressure side intercooler 59, and the oil cooler 82 via cooling water pipes 84a, 84b, 84c, and 84d. In other words, by circulating the cooling water through the high pressure side intercooler 57, the low pressure side intercooler 59, and the oil cooler 82, fresh air from the high pressure turbine 60, fresh air from the low pressure turbine 62, and the engine oil in the oil cooler 82 can be cooled.

Figure 6:
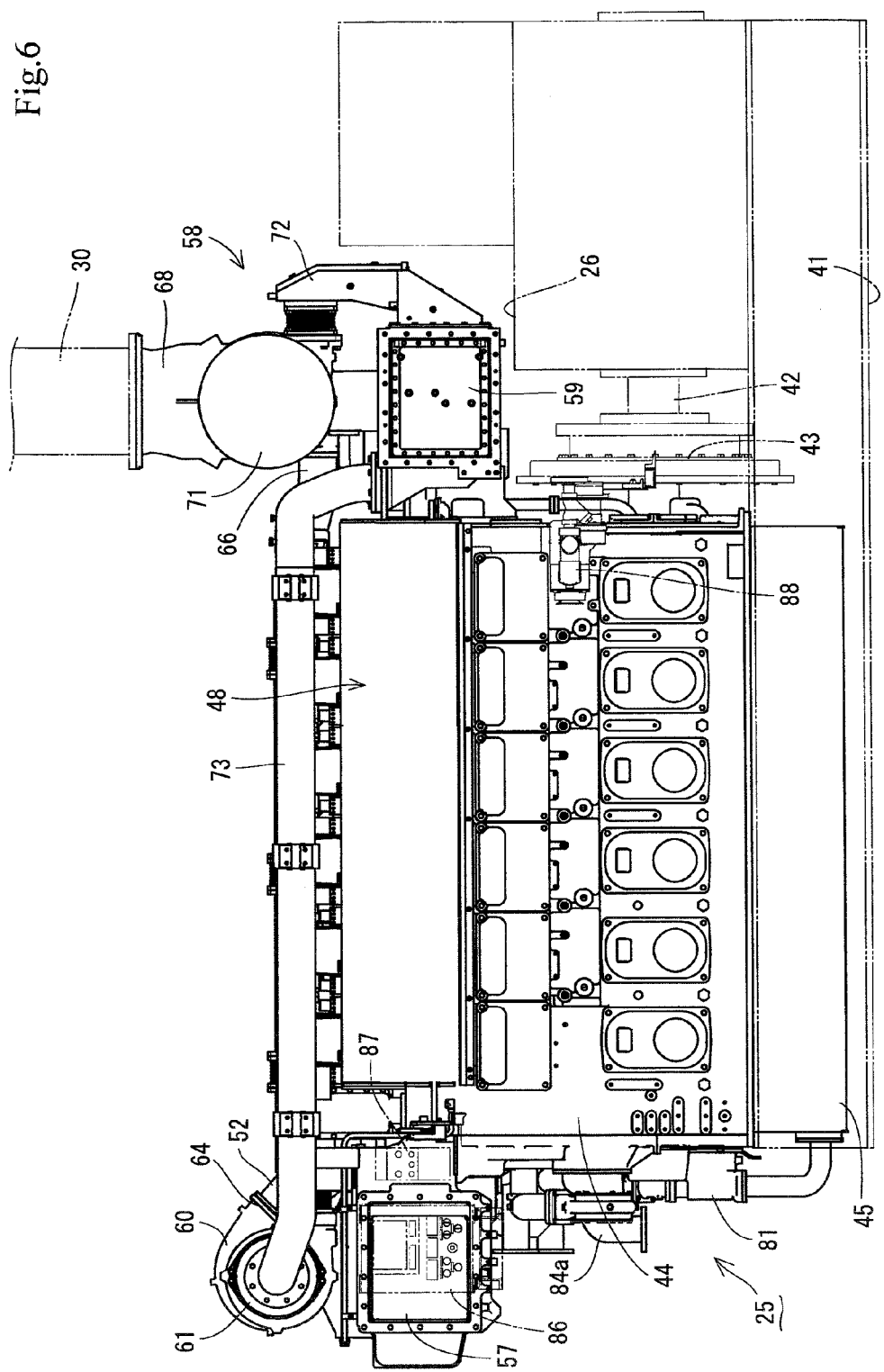
FIG. 6 is a side view illustrating a fuel pump installed room side (right side face) of the diesel engine.
Figure 7:
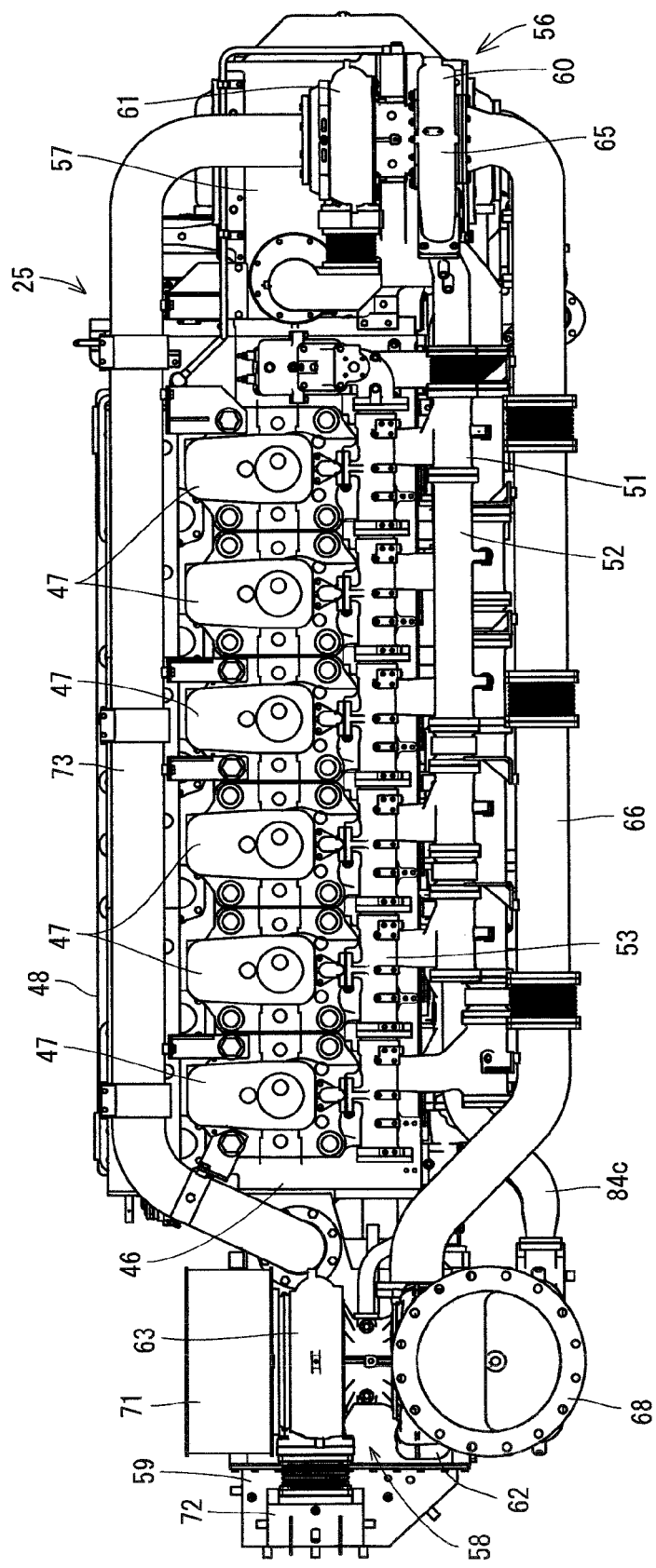
FIG. 7 is a plan view of the diesel engine.

Meanwhile, as illustrated in FIG. 6, an engine control panel 86, the start-stop switch box 87, and an engine starter 88 are each disposed so as to be closer to a side face of the cylinder block 44 in which the (relatively low temperature) fresh air introduction pipe 73 and the fuel-pump-disposed room 48 are disposed. In other words, by moving to the side of the cylinder block 44 in which the fuel-pump-disposed room 48 is disposed, the operator can execute an action such as a starting or stopping operation of the diesel engine 25 without being affected by radiant heat from the first and second exhaust manifolds 51 and 52, the high pressure exhaust gas pipe 66, or the like.

Figure 12:
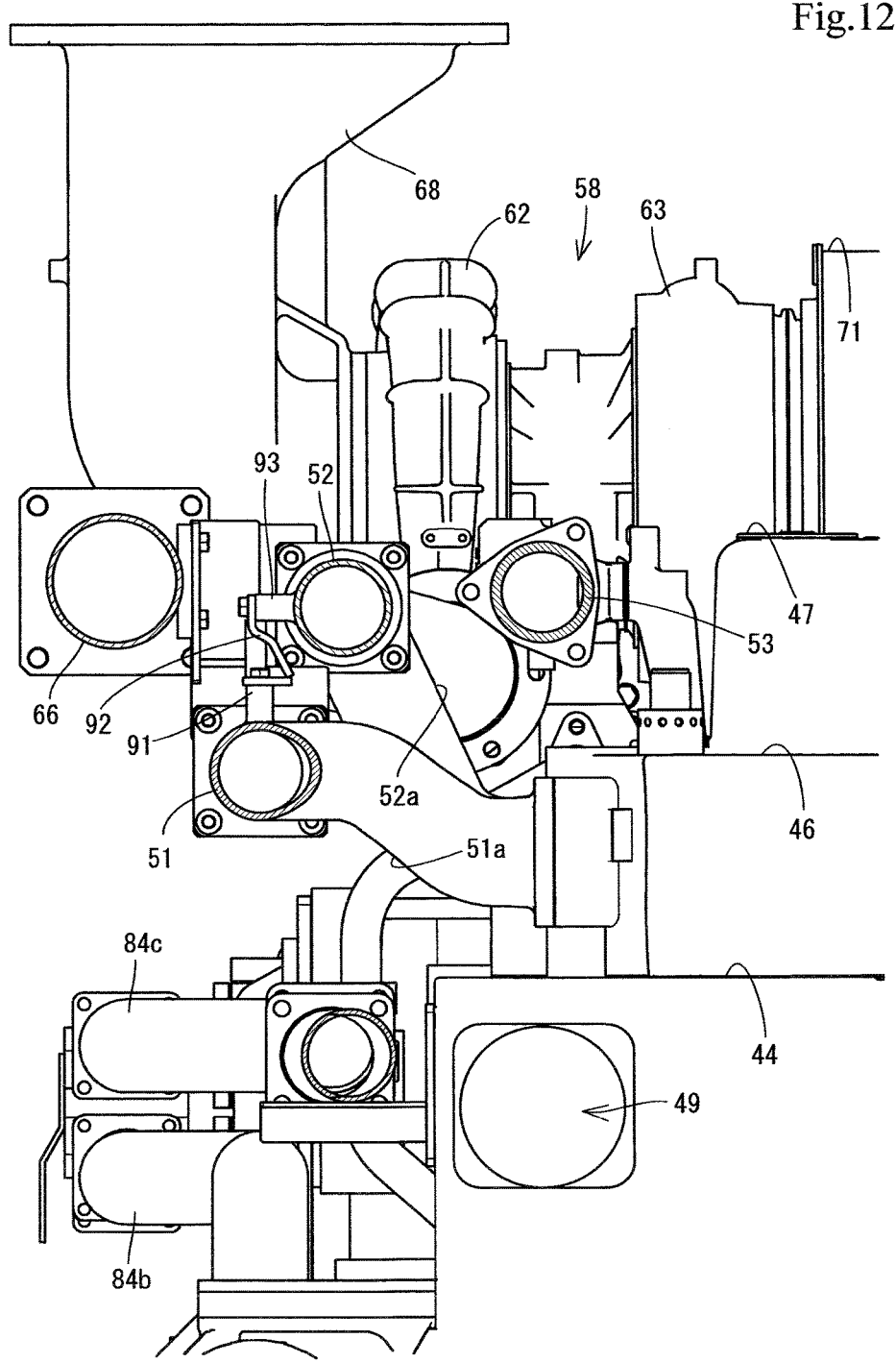
FIG. 12 is a sectional view of an upper side exhaust pipe (upper side pipe, lower side pipe) support portion of the diesel engine.

Next, a pipe supporting structure of the two-stage supercharger 55 will be described with reference to FIGS. 11 to 15. As illustrated in FIG. 12, a lower end side of an exhaust support body 92 is fastened to a boss body 91 on an upper face of the first exhaust manifold 51 by bolt. An upper end side of the exhaust support body 92 is fastened to a boss body 93 on an outside face of the second exhaust manifold 52. The first exhaust manifold 51 and the second exhaust manifold 52 are integrally linked by the exhaust support body 92. The second exhaust manifold 52 extends in parallel to and above the first exhaust manifold 51. Note that the first exhaust manifold 51 and the second exhaust manifold 52 are connected to communicate with the cylinder head 46 via cylinder link pipes 51a and 52a.

Figure 13:
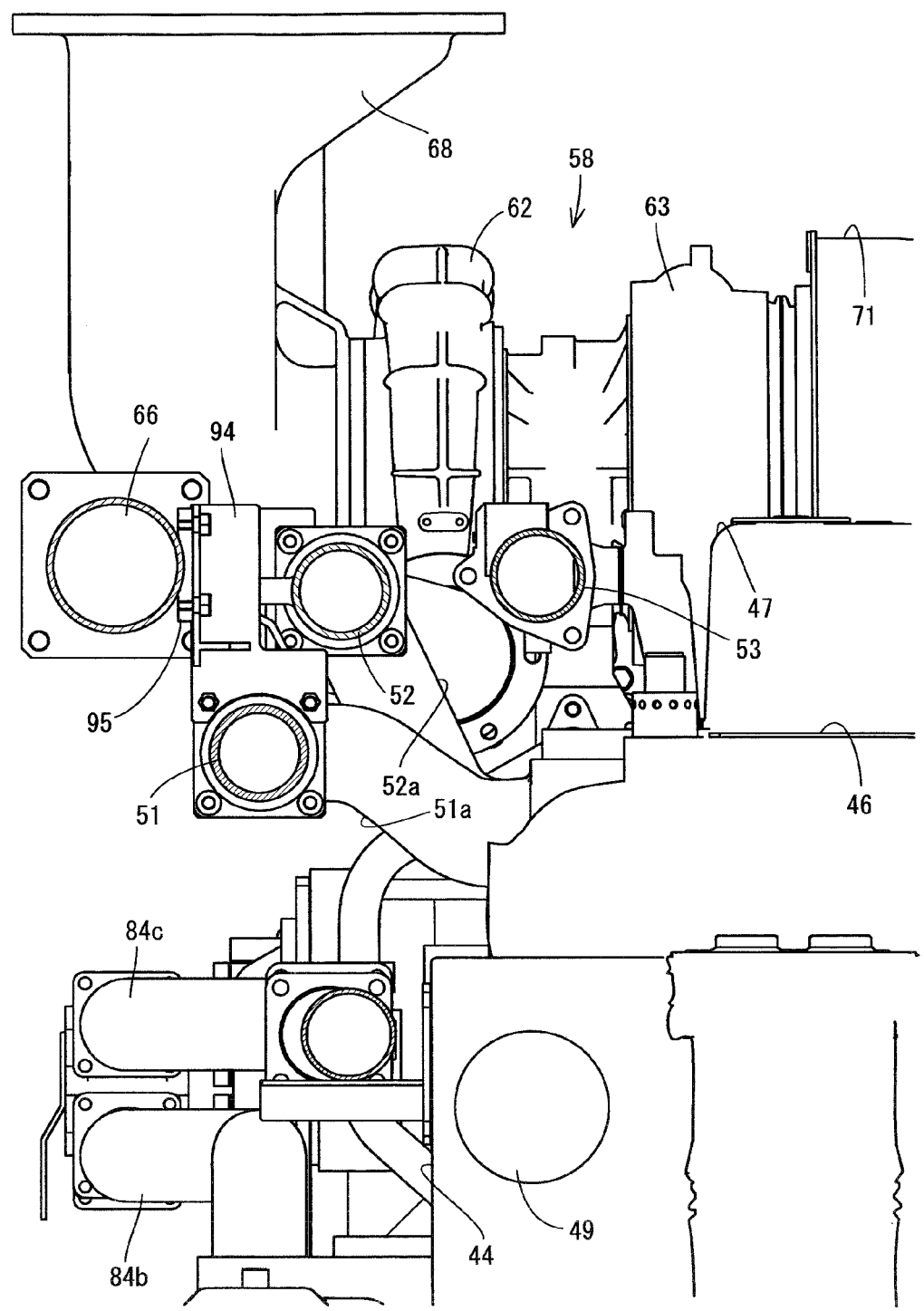
FIG. 13 is a sectional view of a connection portion of the upper side exhaust pipe and the lower side pipe of the diesel engine.
Figure 14:
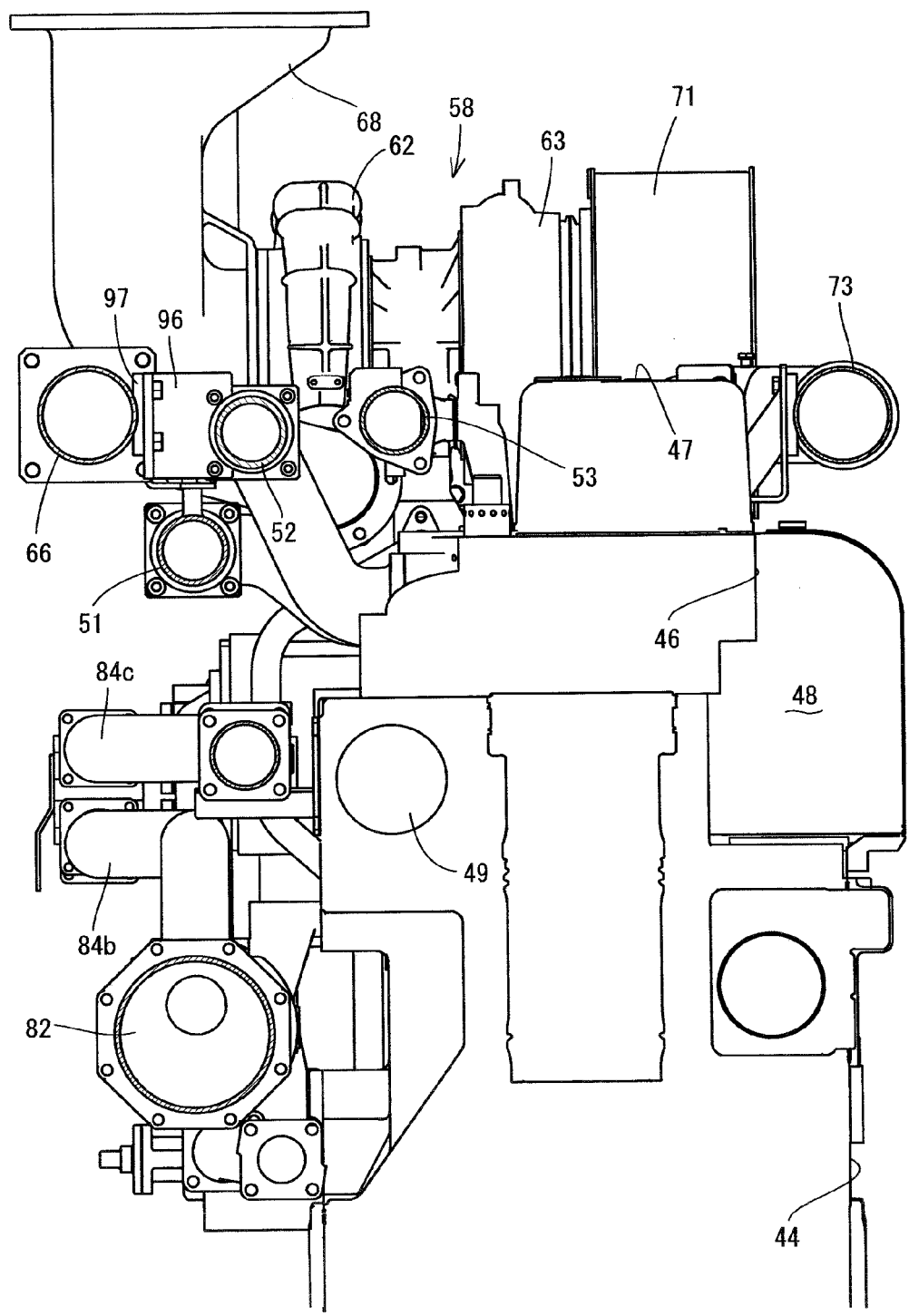
FIG. 14 is a sectional view of a connection portion of the upper side exhaust pipe and the upper side pipe of the diesel engine.

In addition, as illustrated in FIG. 13, the first high pressure support body 94 stands on an upper face side of the first exhaust manifold 51. An upper end side of the first high pressure support body 94 is fastened to a first seat plate 95 on an inside face of the high pressure exhaust gas pipe 66 by bolt. The high pressure exhaust gas pipe 66 is integrally linked to the first exhaust manifold 51 by the first high pressure support body 94. The high pressure exhaust gas pipe 66 extends in parallel and above the first exhaust manifold 51. As illustrated in FIG. 14, one end side of the second high pressure support body 96 is fastened to a link flange portion of the second exhaust manifold 52 by bolt. Another end side of the first high pressure support body 94 is fastened to a second seat plate body 97 on an in-engine side face of the high pressure exhaust gas pipe 66 by bolt. The high pressure exhaust gas pipe 66 is integrally linked to the second exhaust manifold 52 by the high pressure exhaust gas pipe 66. The high pressure exhaust gas pipe 66 extends in parallel and at an engine-outside side of the second exhaust manifold 52.

Figure 15:
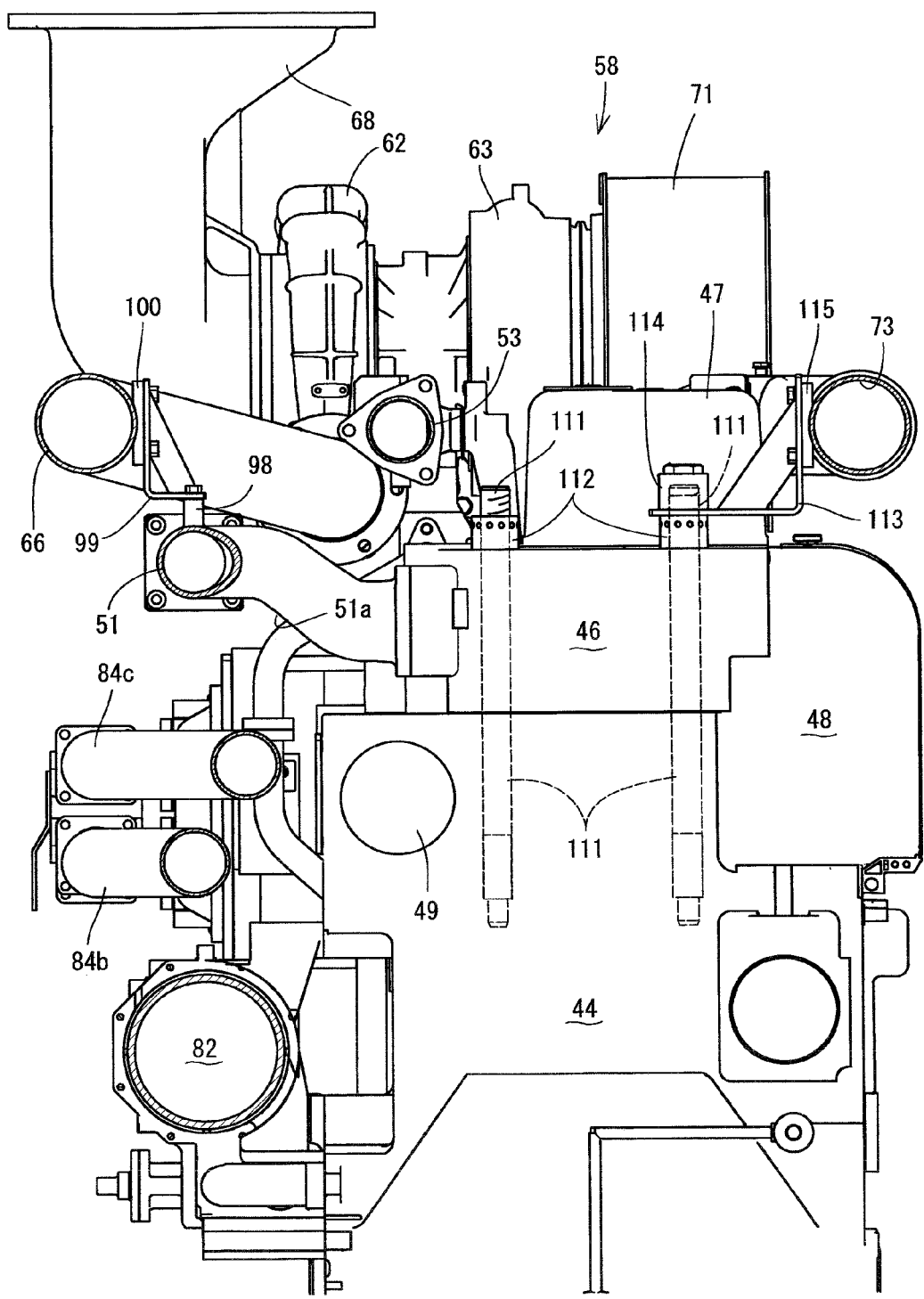
FIG. 15 is a sectional view of an intake pipe support portion of the diesel engine.

As illustrated in FIG. 15, a lower end side of the third high pressure support body 99 is fastened to a boss body 98 on an upper face of the first exhaust manifold 51 by bolt. Another end side of the third high pressure support body 99 is fastened to a third seat plate body 100 on an in-engine side face of the high pressure exhaust gas pipe 66 by bolt. The high pressure exhaust gas pipe 66 is integrally linked to the first exhaust manifold 51 by the third high pressure support body 99. The second exhaust manifold 52 and the high pressure exhaust gas pipe 66 are arranged in parallel at substantially the same support height, and the high pressure exhaust gas pipe 66 is supported by an in-engine side of the second exhaust manifold 52.

In addition, as illustrated in FIG. 15, a lower end side of each head fixing bolt 111 is screwed onto the upper face of the cylinder block 44. The head fixing bolt 111 is disposed in a standing manner on an upper face side of the cylinder block 44, and the head fixing bolt 111 is disposed so as to penetrate the cylinder head 46. An upper end side of the head fixing bolt 111 is disposed so as to protrude on the upper face side of the cylinder head 46. Each head fixing nut 112 is screwed to the upper end side of the head fixing bolt 111. The cylinder head 46 is fixedly fastened to the upper face of the cylinder block 44 by the head fixing bolt 111 and the head fixing nut 112. In addition, the upper end portion of the head fixing bolt 111 is caused to protrude upward from the head fixing nut 112. One end side of an introduction pipe support body 113 is fixedly fastened to the upper end portion of the head fixing bolt 111 by a cap nut body 114, and the other end side of the introduction pipe support body 113 is fastened to a mounting seat plate 115 on an in-engine side face of the fresh air introduction pipe 73 by bolt, whereby the fresh air introduction pipe 73 is linked and supported by the cylinder head 46 via the head fixing bolt 111.

As illustrated in FIGS. 3 to 15, in an engine device in which the high pressure supercharger 56 as a first supercharger and the low pressure supercharger 58 as a second supercharger are disposed in series on an exhaust gas discharge path of the diesel engine 25 for generating power, the engine device has a structure in which the high pressure supercharger 56 and the low pressure supercharger 58 are disposed to be divided on opposed side faces of the diesel engine 25. The first and second exhaust manifold 51 and 52 as upper side exhaust pipes between the diesel engine 25 and the high pressure supercharger 56, the high pressure exhaust gas pipe 66 as a lower side exhaust pipe between the high pressure supercharger 56 and the low pressure supercharger 58, and the fresh air introduction pipe 73 as an intake pipe between the high pressure supercharger 56 and the low pressure supercharger 58 extend to be substantially flush with one another at a head-cover-disposed height of an upper face of the engine. Thus, the first and second exhaust manifolds 51 and 52, the high pressure exhaust gas pipe 66, and the fresh air introduction pipe 73 can compactly be arranged around the head cover 47, and an installation height dimension of the diesel engine 25 can compactly be formed. Nevertheless, by using an upper face corner of the cylinder block 44 in the diesel engine 25, the first and second exhaust manifolds 51 and 52, the high pressure exhaust gas pipe 66, and the fresh air introduction pipe 73 can be mounted highly rigidly, so that support structures of the exhaust manifolds 51 and 52, the high pressure exhaust gas pipe 66, and the fresh air introduction pipe 73 can easily be simplified.

As illustrated in FIGS. 11 to 15, there is formed a structure in which exhaust inlet portions (the cylinder linking pipe 51a, the cylinder linking pipe 52a) of the first and second exhaust manifolds 51 and 52 are linked to the cylinder head 46 of the diesel engine 25. In this structure, the high pressure exhaust gas pipe 66 is supported by and linked to the first and second exhaust manifolds 51 and 52 via the first to third high pressure support bodies 94, 96, and 99. Thus, a support structure of the lower side exhaust pipe can be formed highly rigidly, and the support structure of the lower side exhaust pipe can easily be simplified. Nevertheless, an engine outside of or above the first and second exhaust manifolds 51 and 52, whose temperature increases, the high pressure exhaust gas pipe 66, whose temperature is lower than that of the first and second exhaust manifolds 51 and 52, can be disposed.

As illustrated in FIGS. 12 to 15, the upper side pipe (the second exhaust manifold 52) and the lower side pipe (the first exhaust manifold 51) are provided as the upper side exhaust pipe, and the second exhaust manifold 52 and the high pressure exhaust gas pipe 66 are fixedly disposed at substantially the same height. Thus, within a vertical dimension of the cylinder head 46 and the head cover 47 in the diesel engine 25, the first and second exhaust manifolds 51 and 52, and the high pressure exhaust gas pipe 66 can compactly extend.

As illustrated in FIG. 15, there is formed a structure in which the cylinder head 46 is fastened to the cylinder block 44 in the diesel engine 25 by the head fixing bolt 111. In this structure, the fresh air introduction pipe 73 is mounted to the head fixing bolt 111 via the introduction pipe support body 113 as an intake pipe support body. Thus, support strength of the introduction pipe support body 113 can easily be ensured, a support structure of the fresh air introduction pipe 73 can be formed highly rigidly, and a support structure of the fresh air introduction pipe 73 can easily be simplified by using the head fixing bolt 111 in common.

Figure 3:
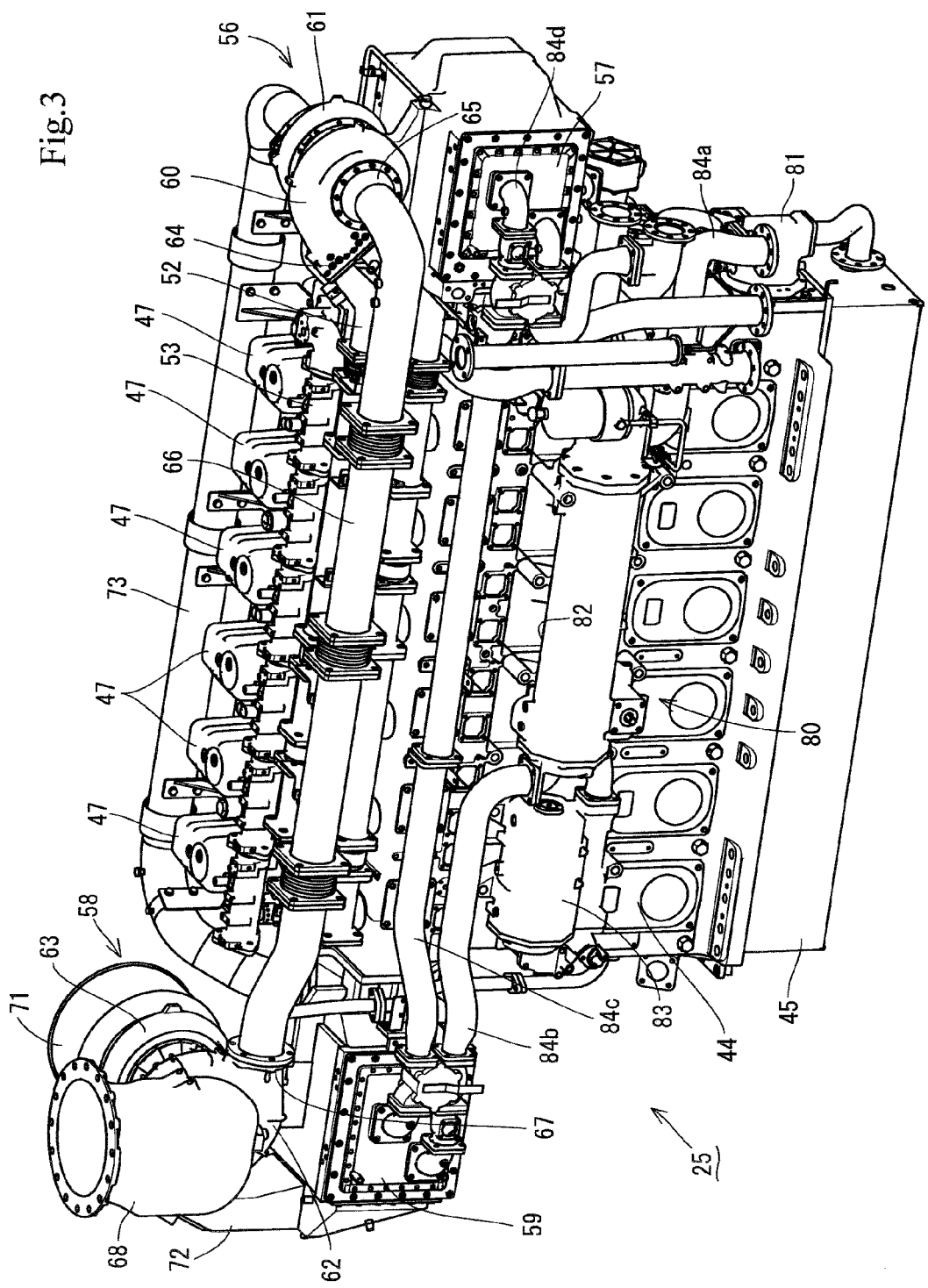
FIG. 3 is a perspective view illustrating an intake-and-exhaust manifold side (left side face) of a diesel engine.
Figure 4:
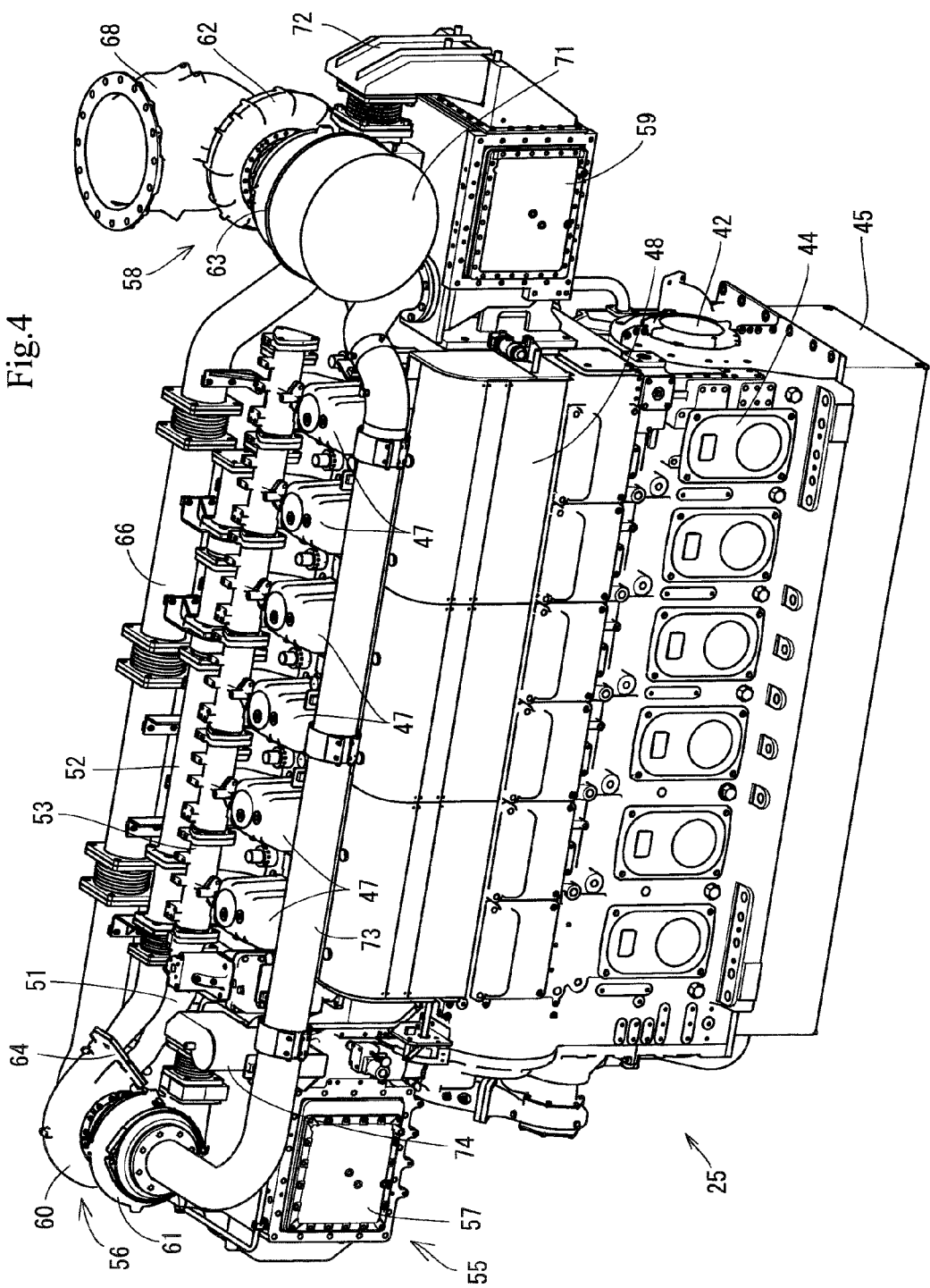
FIG. 4 is a perspective view illustrating a fuel pump installed room side (right side face) of the diesel engine.
Figure 8:
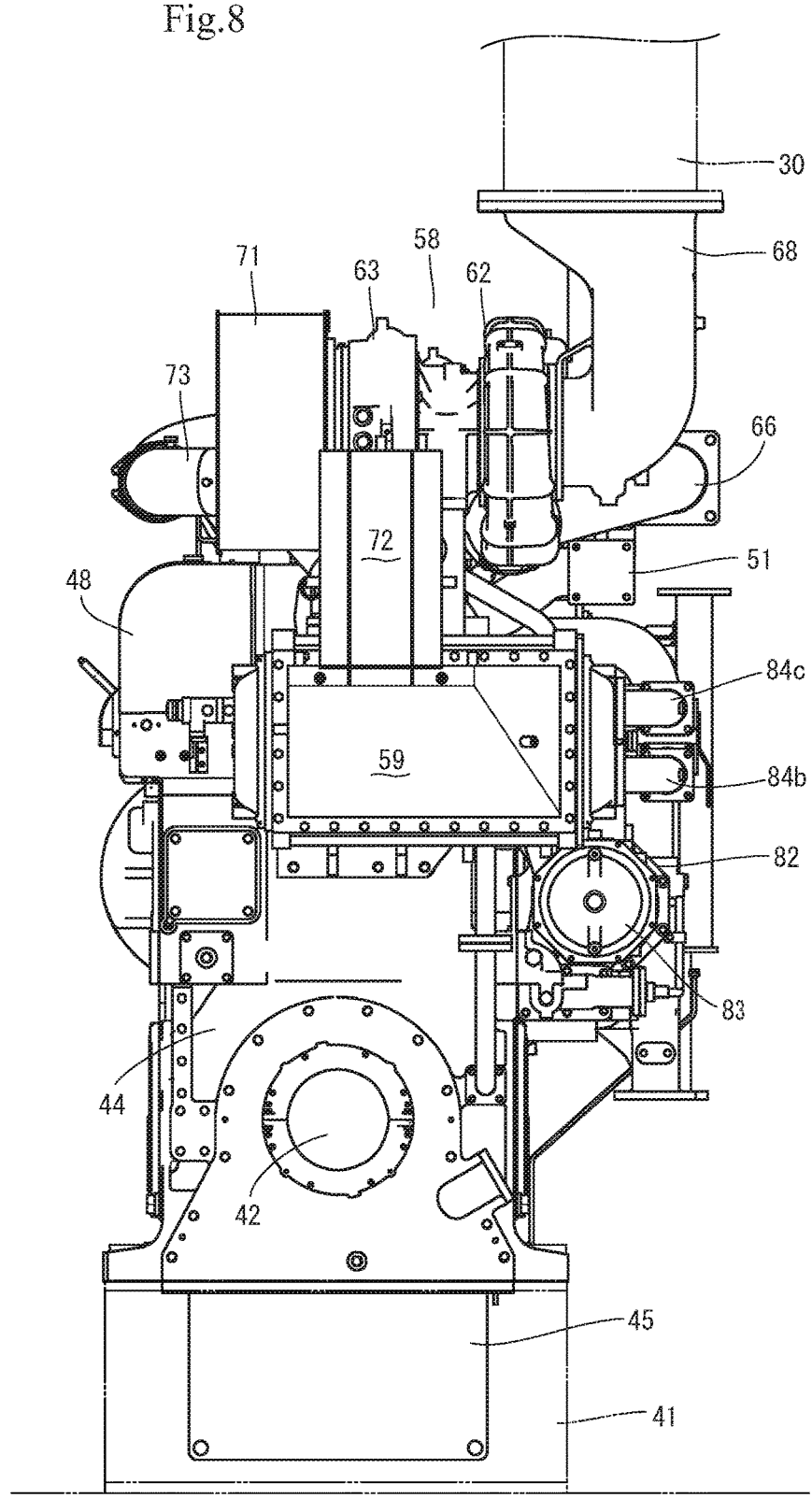
FIG. 8 is a side face view illustrating a low pressure supercharger side (back face) of the diesel engine.
Figure 9:
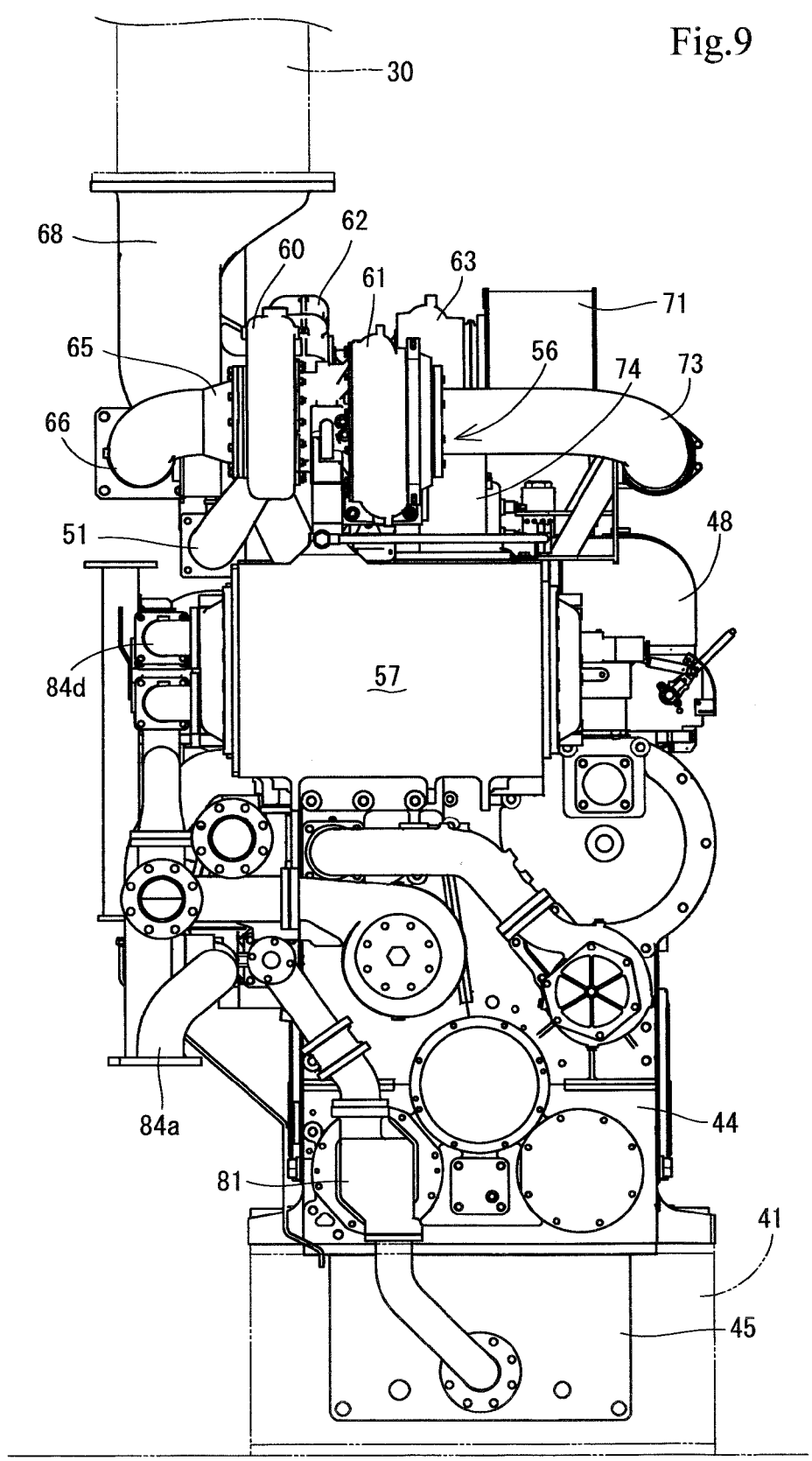
FIG. 9 is a side face view illustrating a high pressure supercharger side (front face) of the diesel engine.
Figure 10:
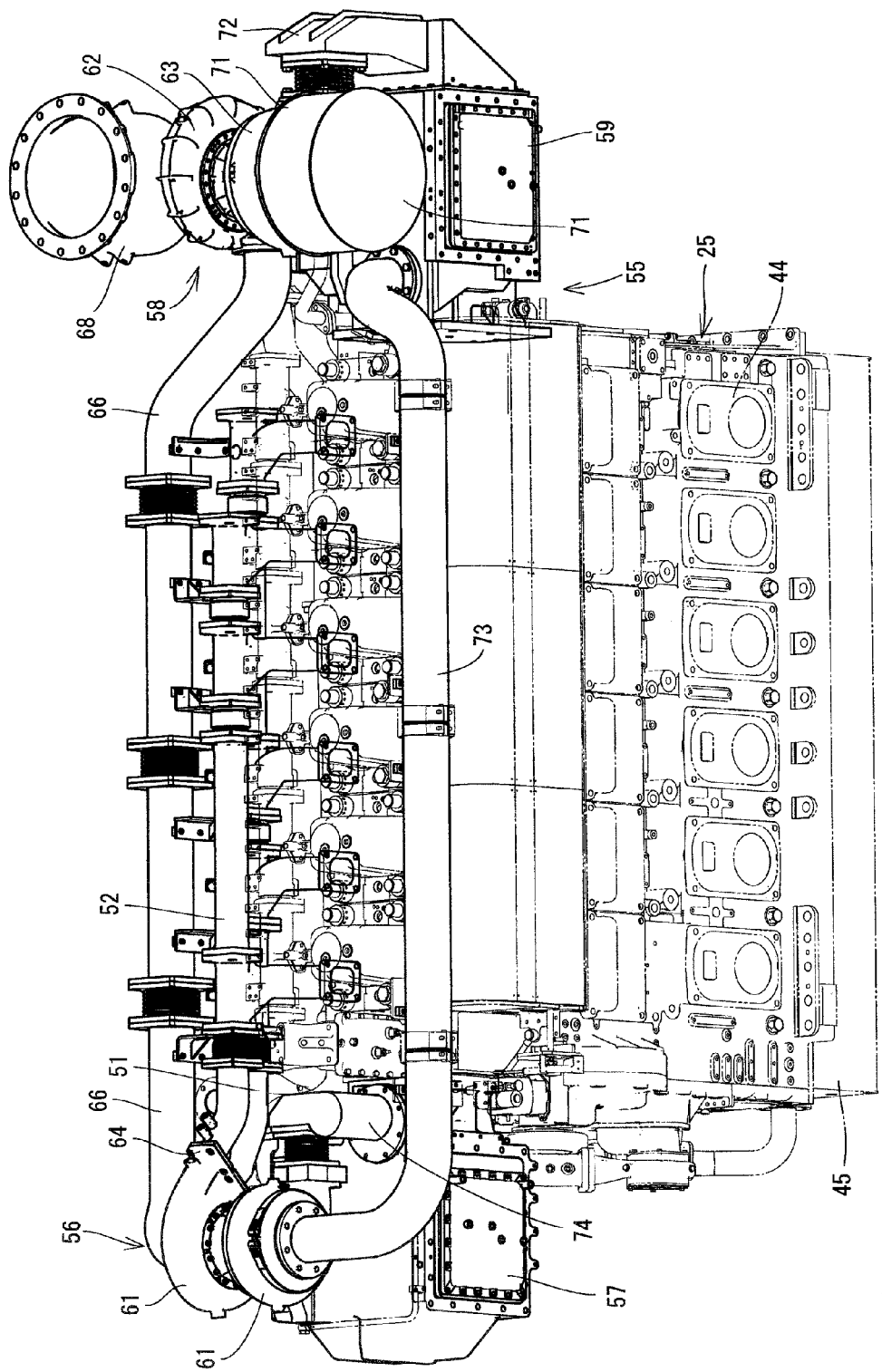
FIG. 10 is a perspective view illustrating an intake and exhaust structure of the diesel engine.
Figure 11:
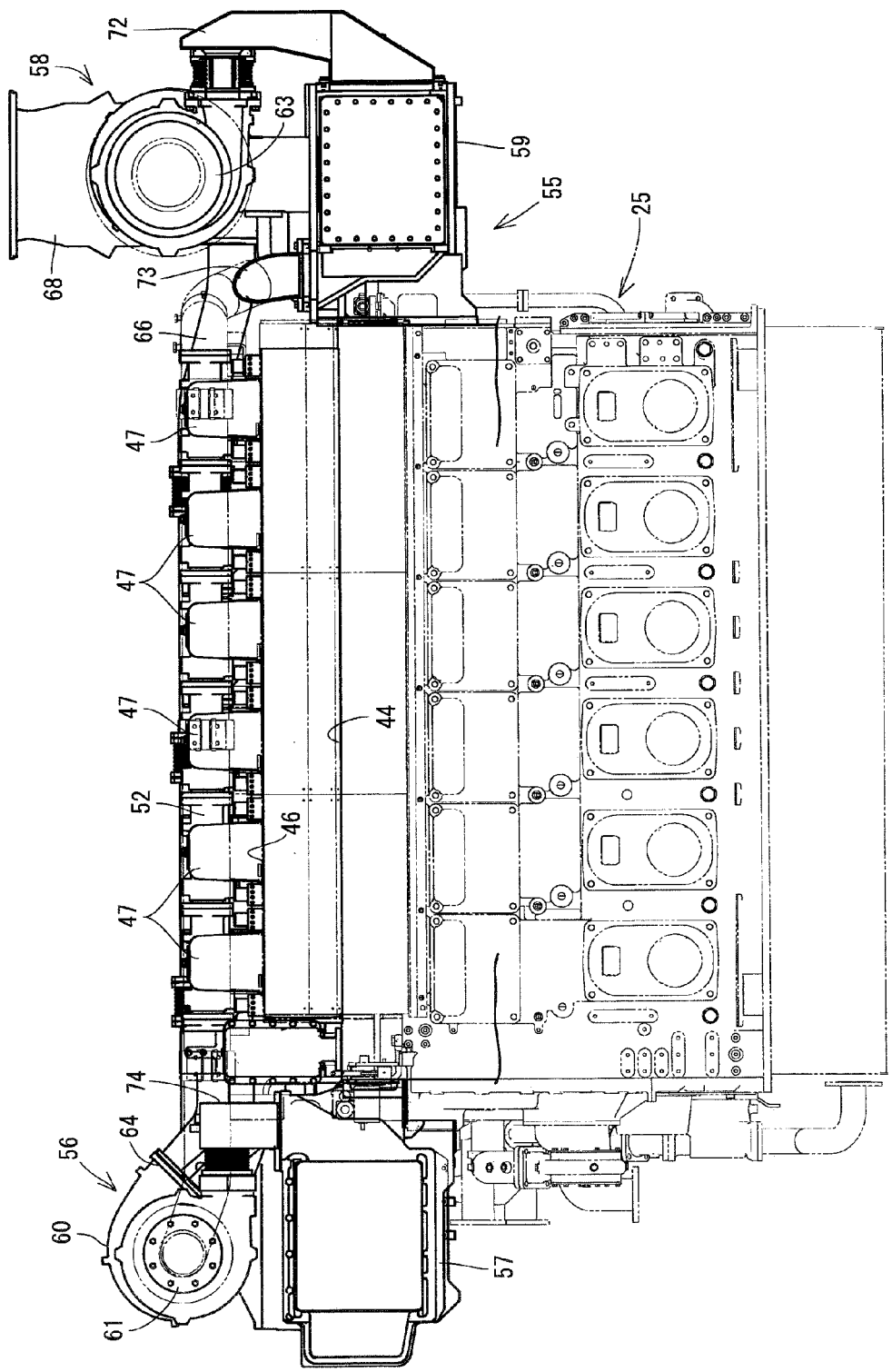
FIG. 11 is a side face view illustrating a fuel pump installed room side of the intake and exhaust structure of the diesel engine.

As illustrated in FIGS. 3, 5, and 8, there is formed a structure in which attachment components, such as the oil cooler 82 or the oil filter 83 and the like, are arranged at one side of the cylinder block 44 in the diesel engine 25, and, as illustrated in FIG. 6, the engine control panel 86, start-stop switch box 87, and the engine starter 88, as engine operating tool are disposed at the other side of the cylinder block 44 in the diesel engine 25. On the upper face side of the diesel engine 25, the first and second exhaust manifolds 51 and 52 or the high pressure exhaust gas pipe 66 is disposed closer to the upper face side of one side in which the attachment component (the oil cooler 82 or the oil filter 83) is disposed. In a position away from the first and second exhaust manifolds 51 and 52, the high pressure exhaust gas pipe 66, or the attachment component (the oil cooler 82 or the oil filter 83), an operator can execute operating works such as an operation of starting or stopping the diesel engine 25. On the other side of the cylinder block 44 in the diesel engine 25 in which the start-stop switch box 87, etc., are arranged, the fresh air introduction pipe 73, which has relatively low temperature, is supported, and the number of attachment components on the other side of the cylinder block 44 can be reduced. Operating work space for operator can easily be reserved at the other side of the cylinder block 44, and exhaust heat (radiant heat) of the first and second exhaust manifolds 51 and 52 or the high pressure exhaust gas pipe 66, etc., can be prevented from affecting the operator at the other side of the cylinder block 44, so that operating workability of operation of starting or stopping the diesel engine 25, etc., can easily be improved.

DESCRIPTION OF THE REFERENCE NUMERAL 25 power-generating diesel engine
44 cylinder block
46 cylinder head
47 head cover
51 first exhaust manifold (upper side exhaust pipe, upper side pipe)
52 second exhaust manifold (upper side exhaust pipe, lower side pipe)
56 high pressure supercharger (first supercharger)
58 low pressure supercharger (second supercharger)
66 high pressure exhaust gas pipe (lower side exhaust pipe)
73 fresh air introduction pipe (intake pipe)
82 oil cooler (attachment component)
87 start-stop switch box (engine operation tool)
94 first high pressure support body (connection bracket body)
96 second high pressure support body (connection bracket body)
99 third high pressure support body (connection bracket body)
111 head fixing bolt
113 introduction pipe support body (intake pipe support body)

The invention claimed is:

1. An engine device comprising a first supercharger configured to operate at a higher pressure and a second supercharger configured to operate at a lower pressure, the first and second superchargers being disposed in series on an exhaust gas discharge path of an engine, and a high pressure exhaust pipe linking an exhaust gas outlet of the first supercharger to an exhaust gas inlet of the second supercharger, the engine having a cylinder block and a cylinder head cover, the cylinder head cover forming an upper face of the engine, and a plurality of cylinders aligned in a lengthwise direction of the cylinder block, and further comprising an oil cooler of the engine and an oil filter disposed at one lengthwise side of the cylinder block, and a fuel pump, a start-stop switch box, an engine starter and an engine control panel disposed at another lengthwise side of the cylinder block, the start-stop switch box engine starter and engine control panel being configured to start, stop and control the engine, wherein the first supercharger and the second supercharger are disposed on respective opposed end faces of the engine; and wherein first and second exhaust manifolds communicating between the engine and the first supercharger and disposed between the first supercharger and the second supercharger, and a fresh air introduction pipe between the first supercharger and the second supercharger extend to be substantially flush with one another at a height of the upper face of the engine, and wherein the first exhaust manifold and the second exhaust manifold and the high pressure exhaust pipe extend along the length of the cylinder block and are disposed so as to be closer to the one lengthwise side of the cylinder block on which the oil cooler and the oil filter are disposed than the other lengthwise side of the cylinder block and the fresh air introduction pipe is disposed at the other lengthwise side of the cylinder block and extends along the length of the cylinder block.

2. The engine device according to claim 1, wherein an exhaust inlet portion of the first exhaust manifold is connected to a cylinder head of the engine, and the second exhaust manifold is connected to and supported by the first exhaust manifold via a connection bracket body.

3. The engine device according to claim 1, wherein the engine device has a structure in which a cylinder head is fastened to the cylinder block of the engine by a head fixing bolt, and the fresh air introduction pipe is attached to the head fixing bolt via a fresh air introduction pipe support body.

4. The engine device according to claim 2, wherein the engine device has a structure in which the cylinder head is fastened to the cylinder block of the engine by a head fixing bolt, and the fresh air introduction pipe is attached to the head fixing bolt via a fresh air introduction pipe support body.

* * * * *